US008509100B2

(12) United States Patent
Roskowski (10) Patent No.: US 8,509,100 B2
(45) Date of Patent: Aug. 13, 2013

(54) USER-INITIATED REPORTING OF MOBILE COMMUNICATION SYSTEM ERRORS

(75) Inventor: Steven G. Roskowski, Los Gatos, CA (US)

(73) Assignee: Carrier IQ, Mountain View, CA (US)

( * ) Notice: Subject to any disclaimer, the term of this patent is extended or adjusted under 35 U.S.C. 154(b) by 81 days.

(21) Appl. No.: 12/371,204

(22) Filed: Feb. 13, 2009

(65) Prior Publication Data

US 2009/0207749 A1 Aug. 20, 2009

Related U.S. Application Data

(60) Provisional application No. 61/029,005, filed on Feb. 15, 2008.

(51) Int. Cl.
*H04L 12/26* (2006.01)

(52) U.S. Cl.
USPC .......................... 370/252; 709/223; 709/224

(58) Field of Classification Search
USPC .................. 370/241–253, 216–228
See application file for complete search history.

(56) References Cited

U.S. PATENT DOCUMENTS 6,314,086 B1* 11/2001 Katz et al. .................. 370/241
2002/0069037 A1 6/2002 Hendrickson et al.
2006/0007870 A1* 1/2006 Roskowski et al. ........... 370/252
2006/0233114 A1* 10/2006 Alam et al. ................... 370/252
2007/0283401 A1 12/2007 Lee et al.
2008/0049786 A1* 2/2008 Ram et al. .................... 370/468
2008/0320343 A1* 12/2008 Eickmeyer et al. ............ 714/57

FOREIGN PATENT DOCUMENTS

KR 10-2006-0068483 A 6/2006
KR 10-2007-0048475 A 5/2007

OTHER PUBLICATIONS

International Search Report and Written Opinion dated Sep. 30, 2009 as issued in International Application No. PCT/US2009/034167 filed Feb. 14, 2009.

* cited by examiner

*Primary Examiner* — Charles C Jiang (74) *Attorney, Agent, or Firm* — Workman Nydegger (57) ABSTRACT

Systems and methods that automatically collect data associated with system-identified errors as well as data associated with events associated with user-initiated actions. A data collection profile defines data to be collected and a user-initiated trigger. When the user-initiated trigger is sensed, data is collected according to the data collection profile. The collected data can be uploaded immediately, or stored for some period of time before being transmitted to a collection system. A user recognizes an event which may not be recognizable by the system and the user provides an input defined as the user-initiated trigger. Data may be collected for a brief time before, during and a brief time after sensing the user-initiated trigger and may be uploaded to a system. The user may annotate the collected data by explaining the error, after which the explanation is correlated with the collected data.

24 Claims, 6 Drawing Sheets

USER-INITIATED REPORTING OF MOBILE COMMUNICATION SYSTEM ERRORS

CROSS-REFERENCE TO RELATED APPLICATIONS

This Application claims the benefit of U.S. Provisional Application Ser. No. 61/029,005, filed Feb. 15, 2008, which is incorporated herein by reference.

BACKGROUND OF THE INVENTION

1. The Field of the Invention

The present invention relates generally to monitoring and data collection in communications networks. More particularly, embodiments of the invention relate to systems and methods for collecting data related to communication system errors that are not easily detected.

2. The Relevant Technology

As a result of advances in technology and enormous increases in the number of wireless device users, the size and complexity of wireless communications networks has greatly increased. One consequence of such increases in size and complexity has been a relative increase in operational and performance problems associated with communications networks. Reliability issues, such as dropped calls, lack of coverage, poor audio quality, and application failure often lead to user frustration and to increased costs. As new services are introduced that use even more complex technology, exercise different usage modalities, and place additional demands on networks, network performance continues to be a prime concern. In fact, quality of service has a direct impact on a service provider's profitability. Therefore, improving quality of service is a top priority for service providers.

Network monitoring solutions are widely employed by service providers. However, currently available solutions typically monitor and diagnose only subsets of the overall telecommunications system and therefore do not provide the holistic view of network and device performance needed to efficiently identify and resolve quality issues. The resulting operational metrics from a subset of the telecommunications system can sometimes be indicative of a broader, system-wide problem, but rather than providing answers, problem resolution entails guesswork and extended troubleshooting, which wastes valuable resources.

Another monitoring approach known in the art involves pre-programmed service monitors, where specific elements perform service transactions to emulate "real-world" transaction activity; end to end performance is then monitored and the results reported. While these solutions catch systematic failures, they cannot detect intermittent or dispersed problems, subtle impairments, or device or end user specific issues. Further, they can only test anticipated usage scenarios and fail to adapt to new usages and interactions between services.

While conventional solutions for monitoring networks may contribute in some way to improving quality of service in a communication network, they typically rely on automatically detecting the occurrence or nonoccurrence of an identifiable failure, impairment or error, which may be collectively referred to as "events." Significantly, many system events are difficult to detect on an automated basis. For example, if an application on a wireless device runs slowly, it is possible the application thinks everything is working correctly. From a user's perspective the slow run-time indicates something is wrong, while from the software perspective the system is running correctly. This results in no data being collected around the this type of event because the system does not recognize an event.

In order to collect data relating to these events, some solutions have been proposed or implemented that combine customer care calls with extracting data from the attached wireless device. This model relies on the user calling in to a care agent who can then "probe" their system for diagnostic information to resolve a problem. Although this model may help in identifying some types of events, it can be frustrating to users who may have to wait in a calling queue until their call can be taken. Additionally, users may have difficulty providing sufficient contextual and environmental data from the time of the event to help the care agent and network administrators solve the problem. Further, by the time a user talks with an agent to report a problem, any data collected as a result of a probe may lag so far behind the occurrence of the soft event as to be virtually worthless for purposes of analysis.

Thus, what is needed are systems and methods that to enable the collection of more relevant data related to system events.

BRIEF SUMMARY OF THE INVENTION

Embodiments of the present invention are directed to systems and methods for monitoring and collecting data related to communications networks. In particular, embodiments of the invention enable the collection of data relating to events (such as network system errors or device errors) that may not detected by an automated data collection and management system. User-initiated triggers can be defined and, when detected, cause data to be collected and uploaded for analysis. In this manner, a user may initiate the collection of data relating to events which may be undetectable by the system with a simple user input, thereby reducing the time required to collect data from the user. Further, the data collected provides a much better characterization of events. The collected data can properly represent the state of the network, of the device, as well as the location of the device at the time of the user-initiated trigger.

In one embodiment, a data collection profile on a network device defines both the data to be collected and the user-initiated triggers which cause the collection and uploading of the data. When a device user notices an event, the user can cause relevant data to be collected and uploaded by activating the defined user-initiated trigger. User-initiated triggers may be user inputs at the device such as the typing in of a particular key sequence, the pressing of a dedicated key, or the selection of an option from a menu.

Relevant data is uploaded for analysis to a server. Of course, the collected data may be stored at the device and transmitted at a later time. Advantageously, the collected data typically includes the state of the network as well as the state of the device. As a result, the event can be more efficiently analyzed compared to situations where a user simply reports an event but is unable to provide the state of the network or of the device at the time of the event.

In addition, the user may annotate the uploaded data by sending a message to the server which explains the problem or error experienced by the user. The server receives the message and may correlate it with the related uploaded data by identifying the device from which the message was sent. The user may also annotate the uploaded data by accessing a website online, selecting the uploaded data and posting an explanation of the problem or error experienced by the user. The uploaded data and annotation may be used to identify and resolve system errors.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with communications network monitoring and data collection. More particularly, embodiments of the invention enable the collection of data relating to problems and errors including, for example, problems and errors which are not easily detectable by conventional systems. In particular, embodiments of the invention relate to user-initiated reporting of problems or errors in a communication system or in a device operating in the communication system.

In one example, a user notices a problem or error and initiates the reporting of error-related data which, although possibly having been automatically collected by the user's communication device, would not have been transmitted to a data collection and management system without the user-initiated reporting. The user may "annotate" the error-related data by explaining what the problem is from the user's perspective. This annotation may be automatically or manually correlated with the appropriate data set. The error-related data and annotation may be used as diagnostic information to resolve the problem.

In a user-initiated scenario, a user could have a way to trigger or other initiate the collection of data. When triggered, the device or system could collect robust background operating data to accurately capture the context of the device and the environment it is operating in. This would then go into a collection and analysis system which could better represent the users experience to help improve quality. For example, this data can be used to prioritize the problems of a network, characterize problems in the network, characterize the problem, provide feedback to uses on progress related to resolving the problem and the like.

By gathering rich data on customer issues directly from the device but in a context indicated by the user to be a problem numerous benefits can are achieved. Advantageously, embodiments of the invention provide the ability to resolve "soft issues" or "soft events" which are problems for users but are not detectable as such by the system on its own. Over traditional systems where the users input is captured via an external system (the user calls a number and explains the problem for example) much better characterization of what actually happened that bothered the user is collected (dramatically improving problem characterization, prioritization and resolution complexity). In addition the time needed to collect the information is reduced (no time talking to an agent) thereby improving customer satisfaction and reducing costs. Further, because of the direct, contextual "event" model, the linkage between the issue and the users feedback is tighter, automatically improving the systems ability to correctly analyze the problem.

User initiated data collection can be followed by the automatic collection of data or contextual information that enables the event to be analyzed more efficiently and in a manner that likely resolves the user's problem.

I. Exemplary Wireless Communications Network and Wireless Devices

Figure 1:
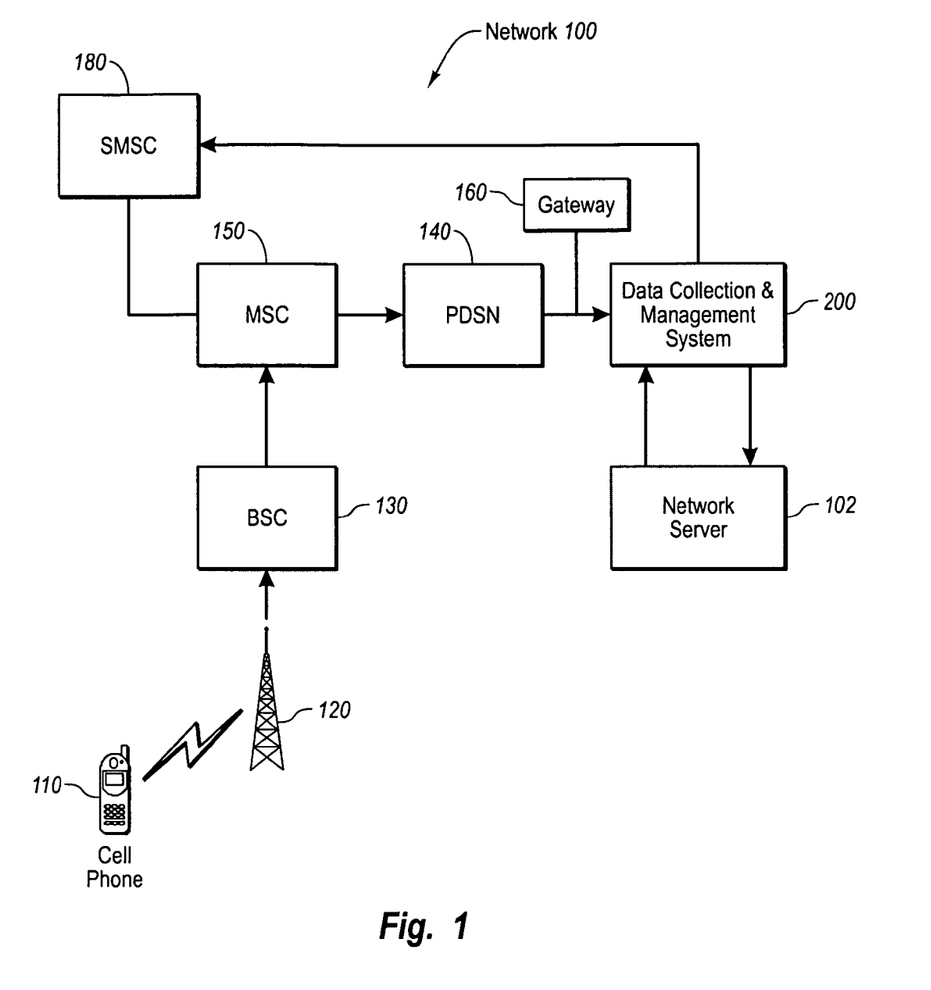
FIG. 1 illustrates an example of a wireless communications network in which the data collection system may be practiced.

The invention may be practiced in conjunction with systems and methods known in the art, including those disclosed in U.S. patent application Ser. No. 11/175,856 (the '856 application), filed Jul. 5, 2005, which is herein incorporated by reference. In order to describe the various methods of the invention, FIG. 1 illustrates an example of a wireless network 100 in which the invention can be practiced. It should be understood, of course, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

The network of FIG. 1 represents only an example of the suitable environments in which the invention can be implemented, and other network architectures are possible. In particular, wireless network 100 is described and illustrated as a Code Division Multiple Access (CDMA) network, whereas the invention can be practiced with other wireless networks, including Global System for Mobile Communications (GSM), Universal Mobile Telecommunications System (UMTS), Time Division Multiple Access (TDMA), Wideband Code Division Multiple Access (WCDMA), General Packet Radio Service (GPRS) networks, 802.11 networks and other networks, including those that will be developed in the future.

In this example, wireless network 100 includes a radio frequency (RF) network that provides radio connectivity and session management for circuit-switched and packet data technology-based communication. Accordingly, wireless network 100 includes or interfaces with all of the elements necessary to route circuit-switched telephone calls and/or packet data communication through the network, including one or more wireless devices 110, a base station 120, base station controller (BSC) 130, mobile switching center (MSC) 150 and a packet data serving node (PDSN) 140. More specifically, the methods of the invention can be used in conjunction with a circuit-switched network, a packet data network, or both.

The methods of the invention may be implemented using various transport protocols, such as Internet Protocol (IP), short message service (SMS) and Short Data Burst services, etc. Wireless network 100 may also include a Home Location Register (BLR), Visiting Location Register (VLR), billing and provisioning systems, one or more gateways 160, the servers and infrastructure necessary to use short message service messages such as the short message service center (SMSC) 180, and may include many other network elements not depicted in FIG. 1. Application servers or third party reporting systems (depicted as network server 102 in the exemplary embodiment), may reside outside network 100 and can be used in conjunction with the present invention. References herein to the terms "wireless network" or "the network" throughout should be construed as inclusive of the network infrastructure, servers, end user devices, and applications and services.

II. Structure of Exemplary Data Collection and Management System

Figure 2:
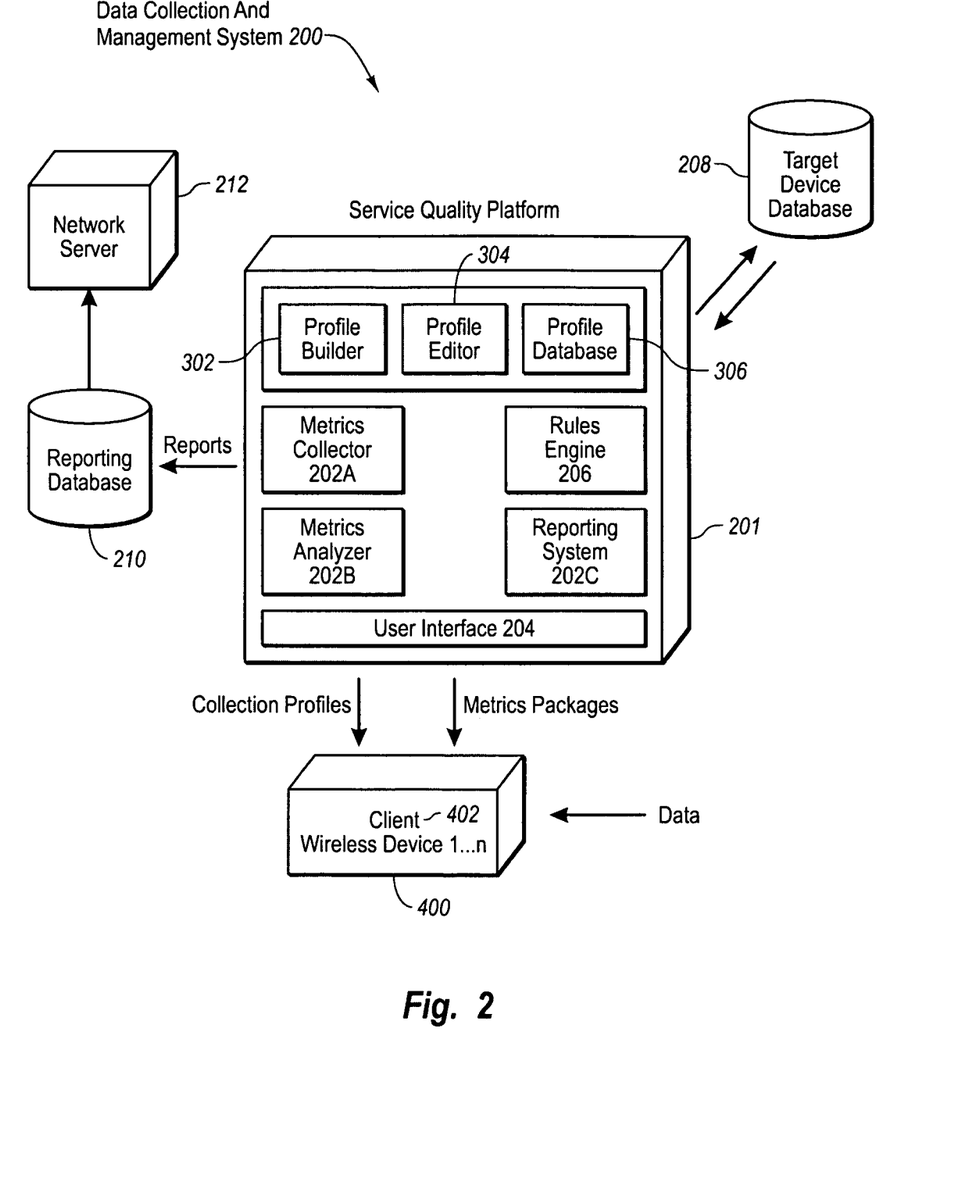
FIG. 2 is a schematic view illustrating aspects of a data collection and management system suitable for use in connection with communications network operations.

FIG. 2 illustrates one embodiment of a data collection and management system 200. Data collection and management system 200, while depicted for purposes of illustration as functioning in conjunction with the packet data network, may receive data from nodes on a circuit-switched network or elements of the system may be located in a circuit-switched network and receive data from a packet data network. Gateways, network monitors and other network elements may be employed to facilitate transmission of data between the networks and the data collection and management system 200. Furthermore, in one embodiment, elements of data collection and management system 200 may be implemented on one or more network servers residing within the network operator's network. Alternatively, data collection and management system 200 may be implemented as a service hosted by a service provider other than the network operator, and elements of the system may therefore reside outside the network operator's network and be equipped to communicate with the various nodes in the network operator's network.

The functionality disclosed herein may be employed in connection with a wide variety of network devices, either wireless or wireline, including radios, personal digital assistants ("PDA"), network servers, desktop computers and other devices associated with network communication. The system 200 interacts with devices 400 to collect data that may be used to analyze system events or device events. As described in more detail herein, the collection of data may be initiated by users of the devices 400. The data may be collected at the devices 400, stored at the devices 400 and then uploaded at a later time. Thus, the user initiated collection of data can be time delayed yet still provide the context of the event.

In embodiment of FIG. 2, the target wireless devices 400 enable an end user to gain access to telephony services and may be equipped to provide access to Internet or multimedia data through any suitable protocol that allows the target wireless devices 400 to participate in a packet data network. Target wireless devices 400 can be substantially any mobile wireless device that can communicate in the environment of wireless network 100, and can be a wireless telephone handset, a wireless personal digital assistant (PDA), or another wireless communication device. The wireless devices can also be referred to as mobile stations, or mobile devices, and hereinafter will be referred to as wireless devices.

Data collection and management system 200 includes service quality platform (platform) 201 and service quality client software (client) 402. Elements of the platform 201 include, by way of example only, metrics collector 202A, metrics analyzer 202B, profile builder 302, profile editor 304, profile database 306, reporting system 205, rules engine 206, and user interface (UI) 204. Data collection and management system 200 further encompasses target device database 208, reporting database 210 and one or more target wireless devices 400 or other network nodes on which resides client 402. Additionally, data collection and management system 200 may communicate with one or more network servers 102, such as a third party reporting system.

This configuration enables the system 200 to dynamically generate and download to a population of wireless devices rule-based data collection profiles. Data collection profiles may be generated manually by a network administrator, a software developer or other personnel involved in the operation of the network (hereinafter referred to as "network administrators"), created offline as a portion of a data analysis solution, or automatically generated based on network parameters or other events. Profiles define what information is to be collected on the devices in response to which conditions and events, as well as the conditions and events that cause the device to upload the collected information.

Conditions or events include any occurrence in the network or on the device that the device can sense, such as a call dropping or a user pressing a button on the device. Conditions and events also include the passage of time, or a request from a network administrator that the device report information back to the server. Conditions and events which cause a device to collect information or upload the collected information may generally be referred to as "triggers."

Client 402 receives data collection profiles and executes data capture processes in response to triggers defined in the profiles, which initiate and terminate data collection activities, as well as in response to other rules and instructions in the data collection profiles. Data collection rules, triggers, and other instructions contained in data collection profiles are sometimes referred to herein collectively as "data collection directives" as a matter of convenience. Data collected by target wireless devices 400 may be buffered by the client 402 awaiting creation of a metrics package. Once created, a metrics package may be archived in the metrics archive of the client 402, deleted, or uploaded to metrics collector 202A.

Sometimes impairments, errors and problems occur on a device which the client 402 cannot sense. Because these soft events are not sensed by the client, a profile cannot define the soft events as triggers which initiate data collection, metrics packaging and uploading, and so on. Accordingly, a profile may be used to define a user-initiated trigger. In this case, the user-initiated trigger may comprise a key sequence, a dedicated key, or a selectable option in a menu.

For example, a user notices an event on the user's device and enters the key sequence, presses the dedicated key, or selects the option in the menu, which is a trigger the device senses. In the exemplary embodiment, this causes the device to prepare and upload a metrics package to the system 200. The client 402 may mark the particular metrics package as a user-initiated package by including information to that effect in a header or otherwise.

The platform 201 may communicate with one or more network servers 102 to provide data collection and management services. For example, reporting system 205 of the platform 201 can provide reports, raw data and other data products to network servers 212. Network administrators and external systems can then access the data by way of network server 212. Elements of data collection and management system 200 may also communicate with various messaging services in wireless network 100 such as SMSC 180 to initiate communication with one or more target wireless devices 400 or to notify network administrators that data has been collected and is available for analysis.

At times, it may not be obvious to network administrators why a user has initiated data collection and reporting, e.g., administrators may not recognize a soft event from the collected data. Hence, users may have the option of annotating user-initiated uploads. For instance, the user can create and send an SMS text message or MMS audio message to the platform 201 or network server 212 explaining why the user initiated the report (e.g., application running slowly, etc.). The platform or network server may capture a device identifier for the user's device from the message header and thereby associate the message with the appropriate metrics package by locating the most recent user-initiated report for the device in question. In another embodiment, the user may externally annotate the uploaded metrics package. For instance, the platform 201 or network server 212 may include a web portal whereby users may go online to access and view data, such as metrics packages, which have been uploaded to the platform or network server and which are associated with particular devices. Users may enter a device identifier, such as their cell phone number, in the web page, select user-initiated uploads associated with their particular device and annotate user-initiated uploads with explanations of why an upload was initiated. These annotations may assist network administrators in pinpointing and resolving network problems.

It should be noted that FIG. 2 illustrates one manner in which various functionalities associated with the data collection management system 200 may be allocated. Accordingly, the functionalities disclosed herein in connection with the data collection and management system 200 may be allocated in a variety of other ways as well depending upon considerations including, but not limited to, the various types of distributed systems and devices employed, the data desired to be collected, and the structure of the communications network or other system. Thus, the functionality allocation illustrated in FIG. 2 is exemplary only and should not be construed to limit the scope of the invention in any way.

III. Exemplary Data Collection Profiles

Figure 3:
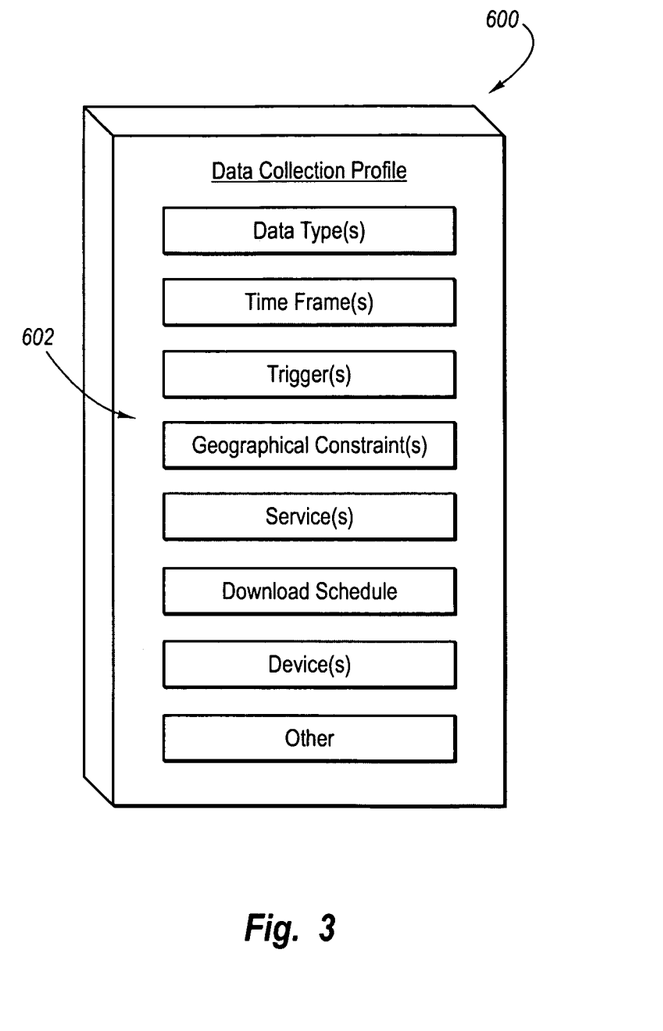
FIG. 3 is a schematic view of a data collection profile that may be employed by embodiments of the data collection and management system.

Attention is directed now to FIG. 3 where aspects of a data collection profile 600 are illustrated. As generally indicated in FIG. 3, the data collection profile 600 includes a variety of parameters 602 that define not only a set of data that is to be collected, but also the conditions under which data collection will take place and the manner in which that data is to be collected and processed.

The data collection profile may be configured to include multiple triggers which initiate and terminate data sampling over some period of time and in response to certain occurrences. In one case, data collection may occur in response to a trigger that is defined as the occurrence of an event. In other cases, data collection may be initiated or terminated in response to a trigger that is defined as the lack of an event occurrence. For example, a data collection profile may specify that data collection begins upon the launch of a particular application and aborts if the device fails to sense a user-initiated trigger (e.g., key sequence, dedicated key, menu option, etc.) while the application is running. In this case, launching the specified application is the initiating trigger that causes data collection to commence, data is buffered, and when the user fails to enter the key sequence, press the dedicated key or select the corresponding menu option while the application is running, the abort trigger causes data collection to cease. In this case, the buffered data may not be transformed into a metrics package, and it may or may not be deleted.

The data collection profile may also contain instructions for the conditions under which collected data is transformed into a metrics package, and whether and when the metrics package is uploaded to the metrics collector 202A. Continuing with the previous example, the data collection profile may specify that if the device senses a user-initiated trigger while the application is running, all the buffer data collected prior to the sensing of the user-initiated trigger, and any other data collected for a specified time after the sensing of the trigger are to be transformed into a metrics package and uploaded to the platform 201. In other cases, the data collection profile 600 may instruct that information about both the occurrence and non-occurrence, as applicable, of specified events, as well as whether data has been collected or not during some period of time be reported to the metrics collector 202A.

As indicated in FIG. 2, the platform 201 includes a profile editor 304 that enables a network administrator to retrieve and edit one or more existing data collection profiles in the event that circumstances require a change to those data collection profiles. Moreover, once completed, the data collection profile 600 may be stored in a profile database 306 for reuse, backup purposes and/or for further editing, copying, or other processes.

In any case, the data collection profile 600 illustrated in FIG. 3 specifies, among other things, the type or types of data that are to be collected in connection with the data collection profile 600. The data collected in connection with the data collection profile 600 may comprise virtually any type of data concerning wireless network 100 and/or target wireless devices 400. Thus, the data desired to be collected may relate to the UI of the target wireless device 400, the application or applications resident on the target wireless device 400, the network services accessed by target wireless device 400, the performance of other network elements such as application and network servers, and considerations concerning the various network layers, such as the transport layer and physical layer.

In addition to specifying various data types, the illustrated data collection profile 600 can also specify a time parameter, namely, the time frame, or time frames, during which some or all of the specified data is to be collected. For example, as a result of users calling customer service to report a non-responsive or slow running application that is not detected by the automated system, a data collection profile is generated that is directed to application analysis. In this case, the data collection profile may specify that data collection is to begin as soon as the wireless device launches the application in question. The collected data enters a buffer on the device so that it can be included as part of a metrics package if a user-initiated trigger is sensed. The data collection profile may further specify as part of the data collection rules, that a ten second buffer of information preceding every launch of the particular application is to be saved, and that data be collected for the duration of the application run-time. In the event that the user-initiated trigger is sensed during application run-time, an additional ten seconds is captured and the data captured before launching the application, during the application run-time and after sensing the user-initiated trigger is transformed into a metrics package. In a typical embodiment, when the client 402 senses the user-initiated trigger, it not only creates the metrics package, but it also uploads the metrics package to the platform 201. Alternatively, the package can be stored and transmitted to the system 200 at a later time.

With continuing attention to FIG. 3, the data collection profile 600 includes, refers to, or implicates various triggers which are used to determine if and when a data collection process specified in the data collection profile should initiate, abort, and terminate. Example triggers include those defined specifically for enabling a user to report mobile communication system errors Upon a determination (e.g., through customer service agents or otherwise) that a soft event is recurring in conjunction with a particular service (or application or device type) the data collection profile 600 may specify that data is to be collected concerning that service (or application or device type). Some implementations of the data collection profile 600 may specify that transmission signal ("Tx") strength data be collected for Internet Protocol (IP) data calls initiated by a network-based instant connect communication session, also known as Push to Talk®. In other cases, the data collection profile 600 may specify that data is to be collected concerning messaging services accessed by the target wireless device 400. Because the wireless device participates in each service delivered to the end user and utilizes a software stack that communicates with each network layer necessary to deliver the service, the ability to collect metrics in relation to a specific service, and ignore those metrics when not utilizing the service, provides a significant benefit over existing solutions.

For example, to monitor the transmit signal strength under the conditions described above, a network probe known in the art would have to monitor all transmit power, for all wireless terminals, across all transports (voice or IP for example), for all services (telephony, messaging, browsing and instant connect communication for example). The scale and scope of this data collection process effectively makes this data uncollectible by any methods other than those disclosed herein in conjunction with the present invention.

In another embodiment, rather than specifying that different sets of parameters be collected at different times, or upon the occurrence or nonoccurrence of different events/triggers, a simplified data collection profile may specify that the same set of parameters be continuously collected by the device. In this embodiment, metrics are measured and stored in a buffer. When the buffer is filled, older metrics are replaced by newer metrics so that the buffer always contains the most recent metrics.

One trigger for this collection profile is a user-initiated trigger. When the client 402 senses a user-initiated trigger, metrics are captured for an additional timeframe, such as ten seconds more, and all the buffered metrics are transformed into a metrics package and uploaded to the system 200. This method may easily be implemented in the system architecture of FIG. 2, as well with conventional device-monitoring software installed on devices at the time of manufacture or downloaded later by users and which runs continuously in the background, monitoring device and application performance.

Further, embodiments of the invention contemplate the collection of data even without the use of data collection profiles. For example, a device may simply capture the metrics that are available, for example, signal strength, tower or sector identification, current application, application state, and the like. This state of the device can be packaged and sent for analyzed.

IV. Exemplary Data Collection Profile Transmission

Data collection profiles may be provided to the wireless devices 400 in a variety of ways, including "pushing" the data collection profile to the target device, sending a message, such as an SMS, to the target device prompting it to retrieve the data collection profile, and preparing the data collection profile for download the next time the target device contacts platform 201 such as when it uploads a metrics package. Such profile transmission to the client 402 residing on the target device(s) may be achieved using any of a variety of transport mechanisms and standards including Short Message Service ("SMS"), Hypertext Transport Protocol ("HTTP"), Hypertext Transport Protocol Secure ("HTTPS"), Wireless Application Protocol ("WAP") Push, IP-based Over-the-Air (IOTA) protocol, OMA/DM, or other protocols that are known in the art or that may be developed in the future.

When received by a target device, the collection profile is processed by the client 402. In some cases, the data collection profile may be stored as received, or integrated with or take the place of previously received data collection profile(s). Factors that affect how the data collection profile is processed by the client 402 include, but are not limited to, the suitability of the device to the data collection requirements defined in the data collection profile, the relative priority of the data collection profile and any previously received profiles, and any explicit processing rules stated in the data collection profile. If processing the new profile by the client 402 results in the data collection activity differing in any way from that specified in the data collection profile (e.g. if the device self-selects out of the data collection activity), the client 402 may communicate back to the platform 201 the specifics of how and why the data collection activity differed.

V. Data Collection and Processing

The data collection function of data collection and management system 200 is based around one or more metrics which are generated and/or collected by the software or hardware of wireless device 400 during its operation, and which are indicative of device and/or network performance. In one case, during the device manufacturing process, software commands are integrated into the operating system or other device software that cause metrics to be generated or collected. As the metrics are generated or collected, they are transformed into a data structure. As the client 402 is presented with the metrics, it determines, based on the data collection profile(s) under its governance, whether a given metric is of interest at the time it is generated, and if so, it may store the metric into a buffer, where it is available to be included in a metrics package at some later time. The process of storing metrics into buffers is referred to as collecting metrics. However, it should be noted that in some cases, the generated metrics may be collected directly into a metrics package without having first been buffered. Otherwise, the process of metrics generation and buffering can occur constantly as part of the basic operation of wireless device 400. The control of this data collection logic is further described below in FIG. 4.

Another mechanism for generating metrics on wireless device 400 involves integrating the software for creating the metrics with application software that is embedded on or downloaded onto the wireless device; this is in contrast to integrating metric-generating commands with, for example, the operating system software of the wireless device during the device manufacturing process. During the development of the application software, an application programming interface (API) is used that allows the application developer to invoke the client 402 with metrics generated by the application.

In the exemplary embodiment, the following aspects are instrumented to generate metrics, but substantially any aspect of the wireless device 400 functionality can generate metrics that can be stored. Metric generation includes all error display routines allowing errors displayed to users to be captured by the data collection and management system for later analysis. Exceptions (software that violates fundamental principles of the target device operation) and task timers (timers that assure no single function can take all the processing resources and that detect infinite loop type errors) can generate metrics that indicate the state of the application when a user-initiated trigger is sensed. When captured and uploaded, the metrics can enable application developers to find errors in their software that occur in the field and significantly speed problem diagnosis. User interface routines including screen refreshes and user input (button presses or other direct input) can generate metrics with the user input which include timestamps. When uploaded the user interface metrics can be used to understand how users interact with the application or device to help optimize application design and detect errors or points of confusion.

Figure 4:
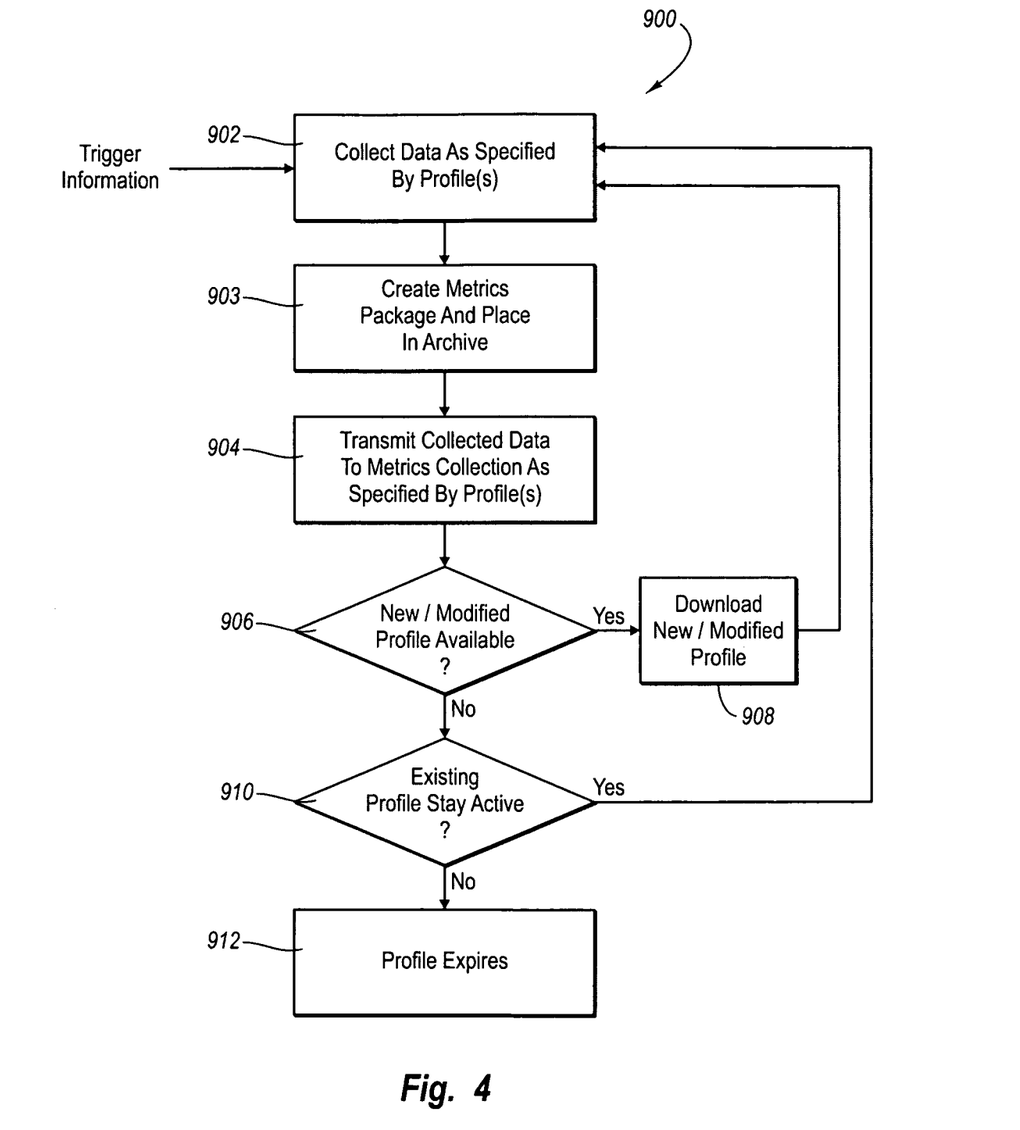
FIG. 4 is a flow diagram illustrating aspects of an exemplary process for collecting data in connection with a data collection profile.

With attention now to FIG. 4, details are provided concerning a process 900 performed by one or more target devices in connection with one or more data collection profiles. The process 900 begins with generation and/or collection of metrics as part of the target device operation. Data collection commences 902 as specified in the data collection profile. Such data collection may commence in response to an initiating trigger, such as the launching of an application, or the data collection may occur continuously while the device is on, and so on. Once a profile is activated, data collection can begin and proceed continuously, and it can start, stop and restart to sample data based on data collection rules and triggers defined in the data collection profile. As noted earlier, during the data collection process, the metrics can be stored in a metrics buffer, or temporary memory, and may or may not ever be used. The metrics buffer may be a circular buffer that stores N samples of data that is available for use, in creating a metrics package if necessary. Use of the buffered data allows a view of metrics generated before a particular error condition occurred, for example. This historical view, along with other metrics surrounding an error condition, can be used in analyzing any particular problem. Thus, in response to a trigger, the buffered data can be captured in a metrics package along with any specified data arriving after the trigger was activated. In other cases, data can be collected and written directly to a metrics package without having first been buffered.

In any case, once the data has been collected, the collected data is transformed 903 by the client 402 into a metrics package and placed in the metrics archive of the client 402. Because device resources are by nature constrained, the client 402 may employ methods for managing the priority of metrics packages stored on the device. For example, each time a metrics package is added to the metrics archive of the client 402, the client 402 calculates the total non-volatile memory used. If the total non-volatile memory required to store a new metrics package exceeds the amount of memory allotted to the metrics archives SQ the client C 402 reassesses the nature of the data in each stored metrics package. In one case, and under certain conditions, one or more metrics packages may be uploaded to metrics collector 202A to make room for the new metrics package on the device. Under certain conditions, the client 402 may employ an algorithm for reviewing the stored metrics packages and selecting metrics packages for deletion. The algorithm may consider criteria including data storage allocations specified in a data collection profile, the nature and priority of the data, the timeliness of the data, the size of the new package to be stored, and the size of the package to be deleted. Selected metrics packages are then deleted from the metrics archive on the device until there is enough memory to store the new metrics package.

The metrics package is transmitted 904 to the metrics collector 202A at a time specified in the applicable data collection profile or profiles. In a typical embodiment, the sensing of a user-initiated trigger causes the client 402 to both create the metrics package 903 and transmit the metrics package 904 to the platform 201. Alternately, the user-initiated trigger may simply cause the client to create the metrics package, in which case the metrics package may be transmitted at a later time, e.g., as the result of an "on-demand" command sent to the device by the system or a network administrator, or as the result of resource management by the client.

Finally, as indicated in FIG. 4, it is determined 906 if a new or modified data collection profile is available for download by one or more target wireless devices 400. While this stage in the process is depicted in FIG. 4 as part of a sequential operation, determination of whether or not a new or modified profile is available for download is not contingent upon any other stage in the data collection process. If a new or modified data collection profile is available, the available new or modified data collection profile is downloaded 908 to the target wireless devices. Otherwise, in accordance with rules specified in the data collection profile, it is determined 910 whether or not the existing data collection profile remains active; if so, it resumes data collection activities 902. In many cases the existing data collection profile may stay on the device for any amount of time with or without modification and perform numerous instances of data collection and upload. However, if the existing data collection profile is determined 910 to be obsolete, the existing data collection profile becomes inactive 912, and in some cases it is automatically deleted from the device.

Figure 5:
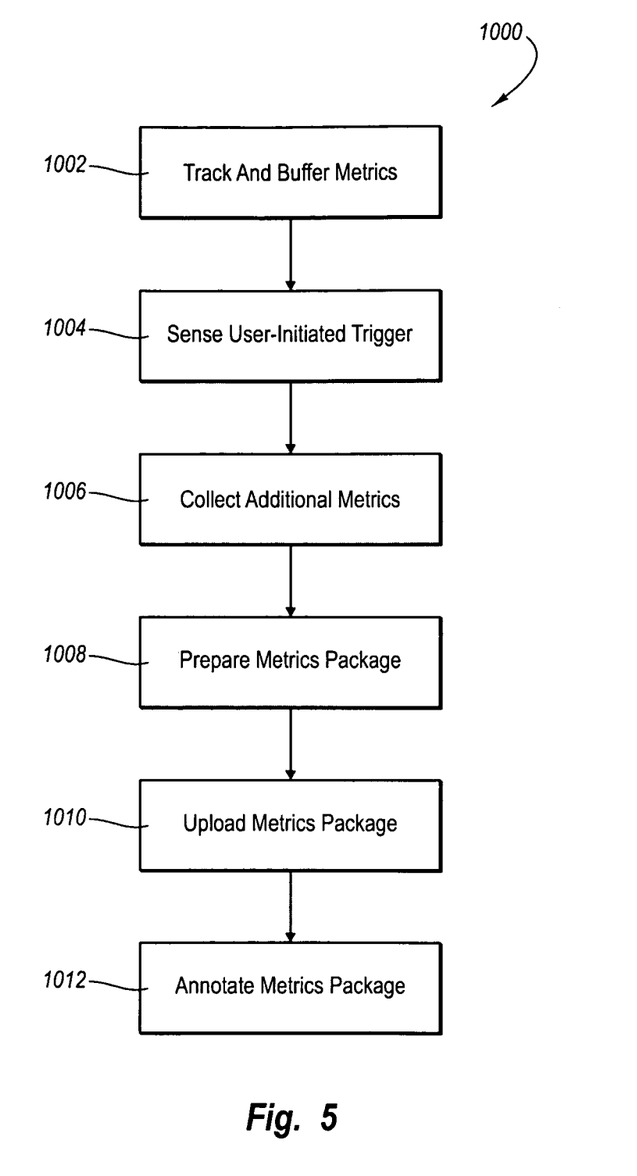
FIG. 5 is a flow diagram illustrating aspects of an exemplary process for collecting data for system errors not recognized by an automated data collection and management system.

Directing attention to FIG. 5, details are provided concerning aspects of a process 1000 for collecting diagnostic data for system or device errors. In some instances, FIG. 5 illustrates a method for collecting diagnostic data for errors or events that are not recognized by an automated data collection and management system, e.g., soft events. The process begins after one or more data collection profiles are received by a wireless device 400. The profile can be specifically configured to collect certain data or can be a default profile. Alternatively, the device may by instructed to collect certain data without the aid of a collection profile.

The data collection profile(s) may specify that one or more metrics are to be tracked and buffered 1002 in a memory buffer. The buffer may be a circular buffer in one example. For example, the buffer may be able to accommodate a certain number of data samples or measurements. In one embodiment, metrics are continuously collected in the buffer while the device 400 is in operation. In another embodiment, the launching of an application or the use of a service may be a trigger causing metrics to be tracked and buffered. In one example, once the amount of metrics stored reaches the capacity of the memory buffer, older metrics are replaced by newer metrics so as to maintain the most recent metrics in the buffer.

The process 1000 provides a way to collect metrics for errors not recognized by the client 402 by defining user-initiated triggers in the data collection profile(s) transmitted to the devices 400. Although described above as being a particular key sequence, dedicated key, or menu option, a user-initiated trigger may generally be any user input defined as a trigger in a profile. Accordingly, a user notices an event with a device, application or service and provides the user input necessary to trigger error reporting; the user-initiated trigger being sensed 1004 by the client on the device. Upon sensing the user-initiated trigger, the client may collect additional metrics 1006 for a limited time before preparing 1008 a metrics package.

In a typical embodiment, the metrics included in a metrics package comprise the metrics stored in the memory buffer as well as the additional metrics collected after sensing the user-initiated trigger, although in other embodiments the metrics package may include only one set of metrics or the other. The memory buffer is usually configured to provide sufficient data storage to include metrics leading up to the problem and to allow for skew between when the user notices a problem and when the user provides the user-initiated trigger input. Hence, if a user normally takes 5 seconds to initiate a trigger after noticing a problem, the buffer may be configured to store 15 seconds of data in order to include at least 10 seconds of metrics leading up to the problem. In this embodiment, the client may not collect any additional metrics 1006 after a user-initiated trigger is sensed because these additional metrics may already be included in the 5 seconds of data collected in the buffer between when the user noticed the problem and when the user initiated the trigger.

As previously described above, user-initiated triggers are typically defined to result in both the preparation 1008 and immediate uploading 1010 of a metrics package by the SQC 402. However, metrics packages may be archived or stored at the device and uploaded at a later time as defined in a data collection profile or upon demand and so on.

Optionally, the user may create and send an SMS or MMS message to a number associated with the platform 201 in order to annotate 1012 the metrics package. The user may also annotate 1012 the metrics package externally (e.g., in some way other than through the same device from which the metrics package was sent), such as by accessing a web page on which uploaded metrics packages are displayed, selecting a metrics package and then typing an explanation of why the user initiated a report.

The user-initiated uploads and user annotations may be processed and analyzed by an analysis system on the platform 201 or network server 212. As compared to conventional solutions, using this data the analysis system can better represent the user's experience to help improve quality, with improved problem prioritization, characterization and resolution as well as improved feedback to users on progress resolving issues.

Figure 6:
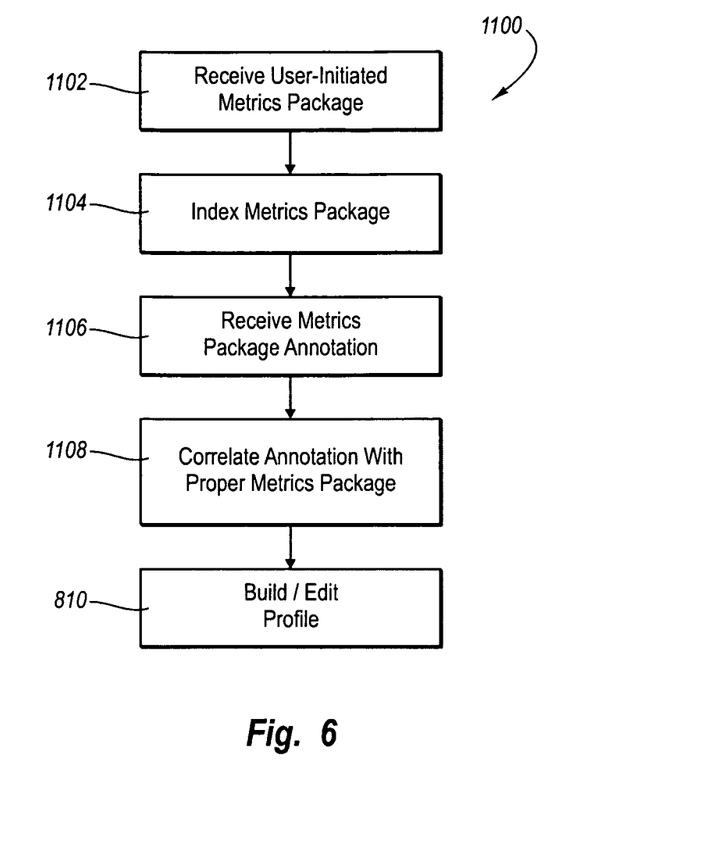
FIG. 6 is a flow diagram illustrating aspects of an exemplary process for annotating collected data.

FIG. 6 depicts an exemplary process 1100 for annotating a metrics package. The process begins when a user-initiated report is uploaded 1102 from a device 400. Such a report may also be referred to as a "user-initiated metrics package." Metrics packages can be indexed 1104 or otherwise related to originating reporting devices 400, data collection profiles and to other metrics packages so that all of the appropriate data can be accessed from the reporting system. At times, it may be helpful to system analysts to have anecdotal descriptions of soft events reported by users, as identifying the nature of these soft events may be difficult from metrics packages standing alone. An anecdotal description effectively describes symptoms of a problem, which analysts may use in conjunction with other collected data to identify and solve problems. Thus, a user annotates a metrics package by creating an anecdotal description which is received 1106 by the platform.

The platform correlates 1108 the annotation with the appropriate metrics package through any of a number of means. In one embodiment, the user sends an SMS text message or MMS voice message to a number associated with the platform. In this embodiment, the message is sent from the same device 400 from which the metrics package is sent. The platform receives the message and extracts the sending device's mobile device number (MDN) from the message header. Whereas metrics packages may be indexed according to originating devices, the platform compares the sending device's MDN to those in the index to locate the most recent user-initiated metrics package received from the sending device 400. The annotation may then be correlated with the most recent user-initiated metrics package.

In another embodiment, the platform includes an Internet interface such that information stored on the platform may be accessed, viewed and modified online. After a user-initiated metrics package is uploaded, the user may access a website associated with the platform. The user may enter the user's MDN, which the platform uses to locate and display user-initiated metrics packages received from the user's device 400. The user may select a user-initiated metrics package and post an anecdotal description of why the user initiated the report. This annotation would then be correlated with the metrics package selected by the user on the website.

The systems and methods described with regard to FIGS. 5 and 6 of collecting diagnostic data for soft issues provide numerous benefits over existing systems and methods. For instance, soft events and related diagnostic data cannot be tracked with conventional automated data collection and management systems (ADCMSs) since soft events evade automated detection by definition. According to the present invention, however, a user may initiate the reporting of diagnostic data when the user notices the soft event.

Existing systems, such as external data collection and management systems (EDCMSs), for monitoring and resolving soft events require a user to call a customer service representative and attempt to explain a soft event to them. In contrast, the present invention permits a user to initiate reporting of a soft event with the touch of a few buttons and without talking to a representative. This reduces the time collecting data from the user, improving customer satisfaction and reducing costs. Additionally, the characterization of the soft event is improved: Although an EDCMS representative may "probe" the network for diagnostic data, the lag between when the user experiences a problem and when a probe is conducted may be so great that the probe-obtained data is worthless, as it does not represent the state of the network at the time the user experienced the soft events. According to the present invention, however, diagnostic data is recorded at the time that the problem is noticed, greatly improving the systems ability to correctly analyze and resolve soft events.

VI. Definition and Use of Triggers

As noted earlier, the data collection processes performed in connection with the network and associated target devices involve the use of certain events, network conditions, trends, data points, and thresholds as a basis for the performance of other actions, such as generation, download or refinement of a data collection profile. In addition, embodiments of the invention provide for the definition and use of various types of triggers in conjunction with data collection profiles.

In the exemplary embodiment, a trigger is one or more conditions defined during an integration process with wireless device 400. Triggers enable the client 402 to be invoked for the purpose of additional metric processing. Each trigger is associated with a specific identifier and defines a specific set of states that are visible to wireless device 400 software. When the client functionality is invoked, the trigger identifier is compared against triggers included in the downloaded profiles to determine the proper course of action. As such, inclusion of a trigger in a specific data collection profile effectively defines the conditions under which that data collection profile is to take a specified action.

In the exemplary embodiment, triggers may be included in the data collection directives of a data collection profile, and their inclusion causes the client to initiate, abort, and terminate data collection activity as appropriate when the associated trigger condition is invoked by the wireless device 400. A trigger invocation that matches the initiating trigger causes data collection activity to begin. A match of the terminating trigger causes the data collection activity to end, and a metrics package is then prepared for uploading. An abort trigger causes data collection activity to cease, and a metrics package is not prepared or is not uploaded. In the example used earlier, launching an application caused the client to be invoked with an "application launched" trigger event, which is matched against triggers in downloaded profiles and causes data collection activity to begin on a user's device. The user's entering of a particular key sequence, pressing of a dedicated button, or selection of a particular menu option while the application is running would cause another trigger to be activated, and the SQC would match the event to a terminating trigger in the profile, cause data collection to stop and a metrics package to be prepared and uploaded. As can be seen, the inclusion of a trigger in a profile effectively selects the condition under which a specific action associated with that profile is to be executed. The trigger is not strictly within the profile, rather it associates specific profile actions (start, stop, abort) with a specific event on the device.

The use of triggers provides for finely tuned data collection activity. By linking profile actions to events defined on the device, substantially any event can be effectively measured, including measurements leading up to it and trailing it in time. Consequently, important trend information and other indicators embodied in the collected data can be quickly identified and exploited, thereby enhancing the quality and usefulness of collected data. Any of a variety of triggers may be defined and employed. Accordingly, the scope of the invention should not be construed to be limited to any particular type, number, combination, implementation or use of triggers. Details concerning some triggers are provided below.

The trigger identities can be included in data collection profiles, and cause an associated action to occur. For example, to define a data collection profile that results in a metrics package with information about soft events which are related to a particular application, but that does not collect information about detectable events related to the application, the following trigger associations could be used:

Initiate Trigger: launch application

Terminate Trigger: user-initiated reporting

Abort Trigger: error automatically and previously detected and reported

In this example, the user launches the application which triggers the client to begin data collection. If the user believes an error is occurring or the application is somehow impaired, the user initiates reporting in one of the manners previously discussed. The user-initiated reporting is the terminate trigger which causes data capture to cease and a metrics package to be prepared and transmitted to the collection system. If the client automatically detects (e.g., recognizes) and creates a metrics package for an application error or problem independently of the user-initiated reporting and within a specified time before the terminate trigger is invoked, the client may abort the creation and transmission of a second metrics package since it is likely to have already been created.

XVII. Telecommunication Devices and Computing Environments

As indicated herein, embodiments of the present invention may be implemented in connection with a special purpose or general purpose telecommunications device, including wireless and wireline telephones, other wireless communication devices, or special purpose or general purpose computers that are adapted to have comparable telecommunications capabilities. Embodiments within the scope of the present invention also include computer-readable media for carrying or having computer-executable instructions or electronic content structures stored thereon, and these terms are defined to extend to any such media or instructions that are used with telecommunications devices.

By way of example such computer-readable media can comprise RAM, ROM, flash memory, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a wireless communication system used by multiple devices, a method for collecting data related to events that occur in the wireless communication system, the method comprising:

identifying data that is to be collected by a device operating in a wireless communication system;

receiving, from a user, input that triggers collection of the identified data, wherein the input concerns an event that is undetectable by the wireless communication system, and wherein the event is associated with the device, an application operating on the device or a service used by the device;

collecting the identified data at the device, wherein the data is collected in response to receipt of the user input; and transmitting, from the device, data that has been collected by the device in response to the input from the user.

2. The method of claim 1, wherein receiving input from a user that triggers collection of the identified data further comprises receiving input of pressing a dedicated key.

3. The method of claim 1, further comprising:
receiving a user-entered explanation of the event, wherein the user-entered explanation is received as an input via a website or a multimedia messaging service voice message.

4. The method of claim 3, further comprising:
correlating the user-entered explanation with the received collected data.

5. The method of claim 1, wherein the collected data includes data collected in a circular memory buffer of the device before the event, data collected in the circular memory buffer of the device at a time of the event, and data collected after the event in the circular memory buffer of the device.

6. The method of claim 1, further comprising:
receiving a user-entered explanation of the event not automatically detected by the system as a short message service text message.

7. The method of claim 6, further comprising:
correlating the user-entered explanation from the short message service with the received collected data.

8. The method of claim 1, wherein the data includes one or more of data about the device, including conditions of the wireless communication system, at or near a time of the event, data about one or more applications operating on the device at or near the time of the event, the service utilized by the device at or near the time of the event.

9. The method of claim 1, wherein the identified data to be collected is defined by a data collection profile.

10. The method of claim 1, wherein the collected data includes information about one or both of the state of the device and the state of the wireless communication system.

11. The method of claim 1, wherein the collected data could not have been transmitted by the device absent receipt, by the device, of the user input.

12. The method of claim 1, wherein a data collection profile defines a correlation between the user input and the identified data.

13. The method of claim 1, wherein identifying data that is to be collected by the device includes examining a data collection profile.

14. In a wireless network that includes multiple devices, a method for collecting data that can be used to analyze an event, the method comprising:
sensing, at a device of a user, a trigger initiated by the user in response to an event identified by the user but which the device is unable to sense, wherein the event is associated with the device, an application operating on the device or a service used by the device;
collecting data in response to the trigger, wherein the collected data is associated with the event identified by the user;
preparing a metrics package that includes the collected data; and
forwarding the metrics package to a collection system.

15. The method of claim 14, wherein the collected data includes:
data describing conditions of the wireless network including signal to noise ratio and neighbor list; and
data describing the device including device settings and firmware version.

16. The method of claim 14, wherein sensing a trigger further comprises receiving input from the user at the device via a dedicated key.

17. The method of claim 14, further comprising receiving a user-entered annotation that includes information describing the event in at least one of a short message service message or input via a website.

18. The method of claim 17, further comprising correlating the user-entered annotation from the short message service message, or the input via the website with the metrics package.

19. The method of claim 14, wherein the collected data includes data collected in a circular memory buffer of the device of the user before the event, data collected in the circular memory buffer of the device of the user at a time of the event, and data collected after the event in the circular memory buffer of the device of the user.

20. The method of claim 14, further comprising:
receiving a user-entered annotation that includes information describing the event in a multimedia messaging service message.

21. The method of claim 20, further comprising:
correlating the user-entered annotation from the multimedia messaging service message with the metrics package.

22. The method of claim 14, wherein the identified data to be collected is defined by a data collection profile.

23. The method of claim 14, wherein the collected data includes information about one or both of the state of the device and the state of the wireless network.

24. The method of claim 14, wherein a data collection profile defines a correlation between the trigger and the collected data.

* * * * *